US006403941B1

(12) United States Patent
Crane

(10) Patent No.: US 6,403,941 B1
(45) Date of Patent: Jun. 11, 2002

(54) IMAGE SCANNER WITH REAL TIME PIXEL RESAMPLING

(75) Inventor: Randy T Crane, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/418,295

(22) Filed: Oct. 14, 1999

Related U.S. Application Data

(60) Provisional application No. 60/106,168, filed on Oct. 29, 1998.

(51) Int. Cl.$^7$ ................................................ H01J 40/14
(52) U.S. Cl. ..................................... 250/208.1; 358/473
(58) Field of Search ............................. 250/208.1, 234, 250/235; 358/473, 444, 445; 382/300, 313, 314

(56) References Cited

U.S. PATENT DOCUMENTS

| | | | |
|---|---|---|---|
| 4,581,761 A | * 4/1986 | Ichinokawa et al. | 382/13 |
| 4,797,544 A | * 1/1989 | Montgomery et al. | 250/221 |
| 5,578,813 A | 11/1996 | Allen et al. | 250/208.1 |
| 5,644,139 A | 7/1997 | Allen et al. | 250/557 |
| 5,729,008 A | 3/1998 | Blalock et al. | 250/208.1 |
| 6,031,943 A | * 2/2000 | Liu et al. | 382/313 |

FOREIGN PATENT DOCUMENTS

EP          0873003 A1       4/1997

OTHER PUBLICATIONS

Christopher D. Watkins, et al., Modern Image Processing: Warping, Morphing, and Classical Techniques, (Cambridge, MA, Academic Press, 1993), pp. 99–102.

* cited by examiner

Primary Examiner—Seungsook Ham
Assistant Examiner—Seung C Sohn
(74) Attorney, Agent, or Firm—Augustus W. Winfield

(57) ABSTRACT

In an image scanner, rectification of sensor data is computed in real time, so that sensor data do not need to be stored into an image memory. As a result, performance is improved because firmware for sensor data storage and retrieval is eliminated, and fewer devices are arbitrating for access to the image memory. The rectification system is extendable to color scanning by providing one rectification module for each color. In various example embodiments, sensor data are entered into a data buffer configured as a first-in-first-out buffer. The buffer is sufficiently long to hold a little more than one scan-line of data. In a first example embodiment, an interpolator module receives sensor data from fixed locations within the buffer. As new values are entered, old unneeded values are simply discarded. Some special conditions require a distinctive (for example, blank or null) value to be inserted to maintain proper data alignment within the buffer. Some special conditions require a value to be discarded to maintain proper alignment. In a second example embodiment, a multiplexer is used to select values from variable positions within the data buffer.

7 Claims, 7 Drawing Sheets

IMAGE SCANNER WITH REAL TIME PIXEL RESAMPLING

CROSS REFERENCE TO RELATED APPLICATIONS

This application claims priority under 35 USC § 119(e)(1) from Provisional Application Ser. No. 60/106,168, filed Oct. 29, 1998, which is incorporated herein by reference.

FIELD OF INVENTION

This invention relates generally to digital image scanners, and more specifically to a system for computing a resampling function on image data, in real time, before the data are stored into memory.

BACKGROUND OF THE INVENTION

Image scanners convert a visible image on a document or photograph, or an image in a transparent medium, into an electronic form suitable for copying, storing or processing by a computer. Reflective image scanners typically have a controlled source of light, and light is reflected off the surface of a document, through an optics system, and onto an array of photosensitive devices. The photosensitive devices convert received light intensity into an electronic signal.

Sensor arrays may be one-dimensional or two-dimensional. For convenience of illustration, much of the present patent document is devoted to a hand-held scanner in which an optics system is used to focus a line on a document image onto a one-dimensional sensor array, but the invention is equally applicable to other types of imaging devices and to two-dimensional sensor arrays.

A picture element (pixel) may be defined as an area on the image being scanned, or as an area on a photosensor array, or as a set of numbers in the data representing an image. For document scanners and transparent film scanners, a pixel is commonly defined as an area on the surface of the document being scanned. For example, for document and transparent film scanners, a common specification is "pixels per inch" (or mm) as measured on the surface of the document being scanned.

Flatbed scanners typically include a linear sensor array that is moved relative to the original image, along an axis that is perpendicular to the axis of the sensor array. The position of the sensor array along the axis of movement is known. By sampling light intensity at appropriate intervals, pixels are determined on a uniform rectangular grid of pixel locations. Typically, each intensity measurement by each sensor element, in conjunction with the optics system, defines a single pixel on the original document and a single corresponding data value in a digital representation of the image.

A hand held scanner requires an operator to manually move a sensor array over an original image. In contrast to a flatbed scanner, manual manipulation is generally not perpendicular to the axis of the linear array, skew introduced by device rotation may change over time, and the movement is generally not at a uniform velocity. Therefore, in general, sensor element intensity measurements for a hand held scanner do not correspond to a uniform grid of pixel locations on the original document. In general, for a hand-held scanner, a uniform grid of pixels in a digital representation of an image must be computed from the non-uniform data from the original sensor data. The process of transforming a digital image from one set of pixel coordinates to another set of pixel coordinates is called geometric image resampling. Resampling from non-rectangular coordinates to rectangular coordinates is called image rectification.

A example of a scanning device for which the present invention is applicable may be found in U.S. Pat. No. 5,578,813 (Allen '813), which is incorporated herein for all that it teaches and describes. Allen '813 describes a hand-held scanner in which a scan-line is defined by the position of a linear array of photosensors. The linear sensor array measures image intensity at uniform positions between the ends of a scan-line. The scan-line may be skewed relative to the sides of the document being scanned and the skew may change as the scanner is moved. In general, the intensity samples measured by the scanner do not fall on a uniform rectangular grid. Separate position sensors monitor the positions of the ends of the scan-line, relative to a starting reference position, as the scanner is moved across the page. Position-tagged intensity data are stored in a memory. Later, the position-tagged intensity data are retrieved and used to compute image pixels at discrete points on a uniform rectangular pixel grid.

Ideally, the rectangular pixel grid has grid lines that are parallel to the sides of the document. For example, if a complete image is saved in memory, image analysis may be performed to determine margins, or edges of photographic images, or other information indicating the orientation of the document. Alternatively, the first scan-line may be used to define a reference position and one of two orthogonal directions. All scan-lines after the first may then be resampled to a rectangular grid that is defined relative to the first scan-line. In the following discussion, for convenience of illustration, pixel grids are depicted as square, having the same pitch for each of the two orthogonal directions. Likewise, for convenience of illustration, the optical sampling rate of the scanner along the direction of movement is depicted as the same as the optical sampling rate along the scan-line. In general, however, each of the two orthogonal directions of the pixel grid may have a different pixel pitch. Likewise, the scanner may have one optical sampling rate along the scan-line and a different optical sampling rate orthogonal to the scan line.

FIGS. 1 and 4 illustrate a prior art hand-held scanner to facilitate later discussion of the present invention in light of the prior art. Likewise, FIGS. 2, 3A and 3B illustrate prior art resampling. In FIG. 1, a hand-held scanner 100 is manually moved across the surface of a document 102 along a serpentine path 104. FIG. 2 illustrates a scan-line 200 with image intensities measured at discrete points 202 along the scan-line. Also illustrated in FIG. 2 is a grid of pixel locations 204. The lines of the pixel grid are ideally parallel to the sides of the document, but may be determined by the first scan-line as discussed above. Separate position sensors (see FIG. 4) are used to measure the relative movement of the ends of the scan-line 200. Given a starting reference position, and given the relative movements of the ends of the scan-line, and given the positions of the measured intensities 202 relative to the ends of the scan-line, the position of each measured intensity 202 may be determined relative to the reference position. The measured intensities 202, and sufficient information to determine the position of each measured intensity 202, are stored in a memory.

FIG. 3A illustrates a series of scan-lines (300, 302, 304, 306) determined by the position of the linear sensor array of the scanner as the scanner is moved across the document being scanned. Each intensity measurement from the scanner sensor array has been assigned a lower-case letter. FIG. 3A also illustrates a grid of pixel locations. The pixel locations have been assigned location notations relative to an arbitrary reference location ($X_0$, $Y_0$). To simplify illustration, in FIG. 3A, each scan-line has five photosensor elements and five intensity measurements. In a typical actual scanner, one linear sensor array may comprise thousands of individual photosensor elements.

FIG. 3B illustrates one method of computing intensities at the pixel locations from measured intensities from the scanner sensor array. One method for computing image rectification is bilinear interpolation using the intensities of the four closest neighboring sensor values. See, for example, Christopher D. Watkins, et al., *Modern Image Processing: Warping, Morphing, and Classical Techniques*, (Cambridge, Mass., Academic Press, 1993), pp. 99–102. A version of bilinear interpolation, as applied to FIG. 3A, is illustrated in FIG. 3B. In FIG. 3B, the (X,Y) locations of sensor values (d), (e), (i), and (j), and the (X,Y) location of pixel ($X_0$+1, $Y_0$) are all known. First, the intensity at point 308 (at $X=X_0+1$) is determined by interpolation between the intensity values for sensor measurements (d) and (i), at the physical locations of sensor measurements (d) and (i). Next, the intensity at point 310 (at $X=X_0+1$) is determined by interpolation between the intensity values for sensor measurements (e) and (j) at the physical locations of sensor measurements (e) and (j). Finally, the intensity at pixel ($X_0$+1, $Y_0$) is determined by interpolation, at $Y_0$, along $X=X_0+1$, between the intensities at points 308 and 310.

FIG. 4 illustrates a block diagram of a prior art system implementing a hand-held scanner in accordance with FIGS. 1, 2, 3A and 3B. A linear image sensor array 400 measures intensities along a scan-line determined by the position of array 400 on a document being scanned. Position sensors 402 sense the relative movements of the ends of the sensor array 400. Analog intensity measurements from the linear sensor array 400 are sequentially amplified (404) and sequentially converted to a numeric value by an analog-to-digital (A/D) converter 406. The outputs of the A/D 406 are sent to a random access memory (RAM) 410 via direct-memory-access (DMA). A processor 408 determines relative positions of the end-points of the scan-line and saves position data in the RAM 410. The processor, in conjunction with a specialized arithmetic unit for rectification (bilinear interpolation) 412, retrieves numeric sensor intensity measurements and position data from the RAM 410 and stores resampled pixel data back in the same RAM 410. The RAM 410 is large enough to buffer intensity measurements and to hold the resulting pixel data.

In FIG. 4, data are being written to RAM 410 by three devices (406, 408, and 412) and data are being read from RAM 410 by two devices (408, 412). As a result, arbitration electronics are required to limit reading to one device at a time, and writing to one device at a time. In addition, time is required to store numeric sensor intensity data from the A/D 406, and then to retrieve that same intensity data multiple times to compute pixel data. Processor firmware is required to manage rectification. As a result, the performance (speed) of the scanner is limited by processor firmware, by the RAM 410 and by the electronics (406, 408, 412) arbitrating for use of RAM. There is a need for a scanner with improved performance.

SUMMARY OF THE INVENTION

In a scanner in accordance with the invention, resampling of sensor data is computed in real time. Sensor data are not stored into an image memory, and processor firmware is not involved in rectification. As a result, the following advantages are realized:

1. The time required for firmware to store sensor intensity data and array position data into memory is eliminated.
2. The time required for firmware to compute addresses, to retrieve sensor intensity data and array position data from memory, and to send sensor intensity data and array position data to the rectifier, is eliminated.
3. Memory arbitration is simplified, and RAM access time is reduced, because fewer devices write to and read from the RAM.
4. RAM is reduced because there is no need to store sensor intensity data and array position data in RAM. Some separate buffering of sensor intensity and array position data is required, but only for less than two scan-lines of sensor data.

In an example embodiment for a single linear sensor array, sensor intensity data are entered into a data buffer configured as a fixed-length, first-in, first-out (FIFO) buffer. The data buffer is sufficiently long to hold one scan-line of intensity data plus two additional intensity values. An interpolator module receives data from the first two elements of the buffer and the last two elements of the buffer (along with position data). As new values are entered, old unneeded values are simply discarded. Some special conditions require a blank or null value to be inserted to maintain proper alignment. The system is extendable to color scanning by providing one data buffer and one interpolator module for each color.

In a second example embodiment, the data buffer is sufficiently long to hold one fall scan-line of intensity data, plus enough additional values to accommodate non-alignment of adjacent scan-lines. In the second example embodiment, when the ends of consecutive scan-lines are not aligned, the interpolator reads different buffer elements. This is in contrast to the first example embodiment, where the buffer elements being read by the interpolator are fixed, and blank or null values are inserted to accommodate alignment variations.

DETAILED DESCRIPTION OF THE PREFERRED EMBODIMENT OF THE INVENTION

Figure 1:
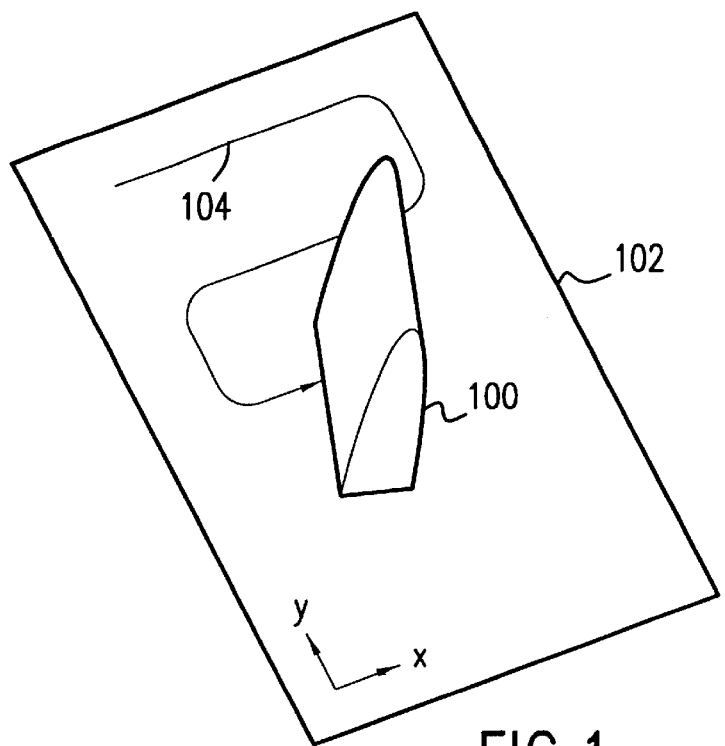
FIG. 1 (prior art) is a perspective view of a hand-held scanner on a document.
Figure 2:
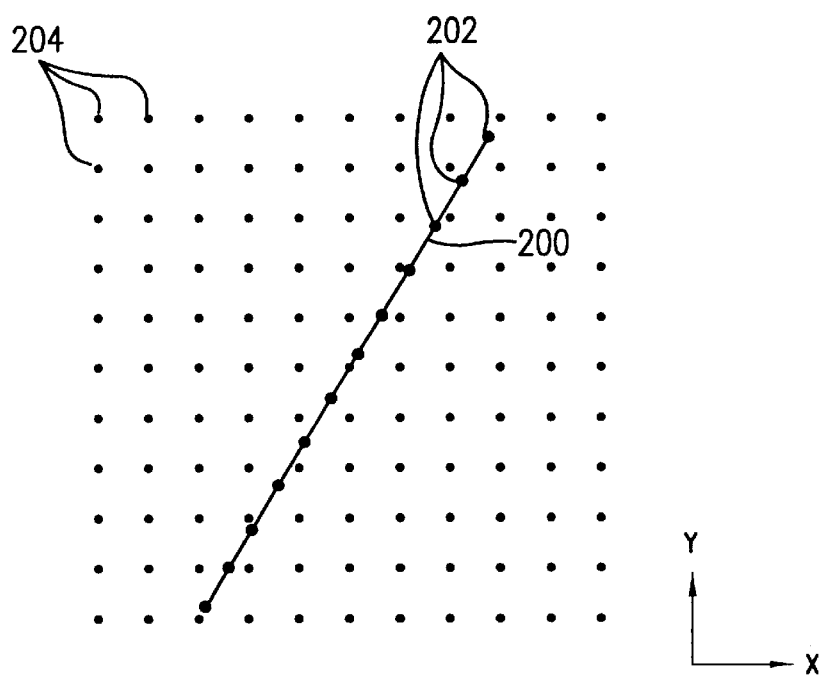
FIG. 2 (prior art) is a plan view of a scan-line on a pixel grid.
Figure 3A:
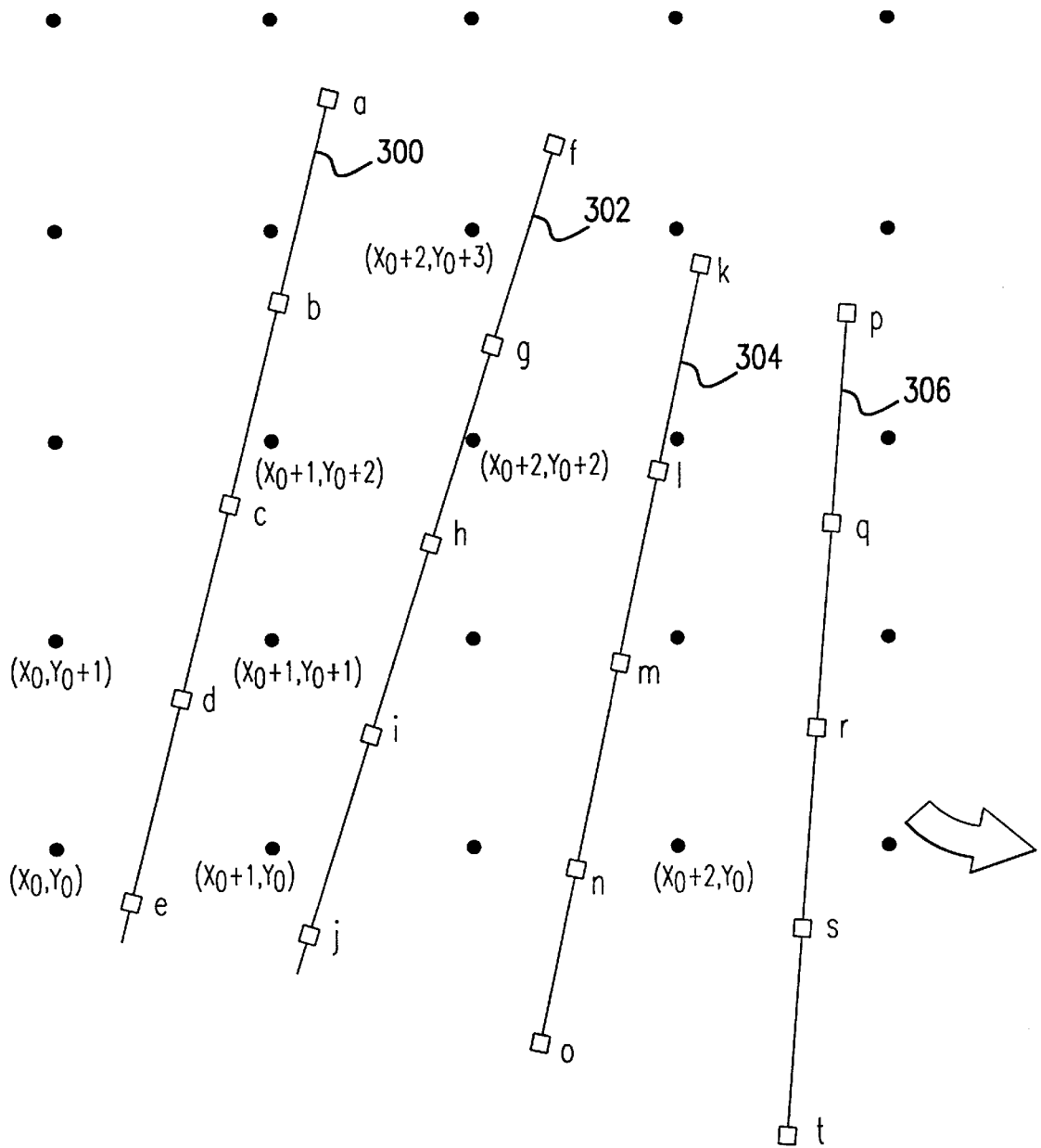
FIG. 3A (prior art) is a expanded view of a pixel grid with multiple scan-lines.
Figure 5:
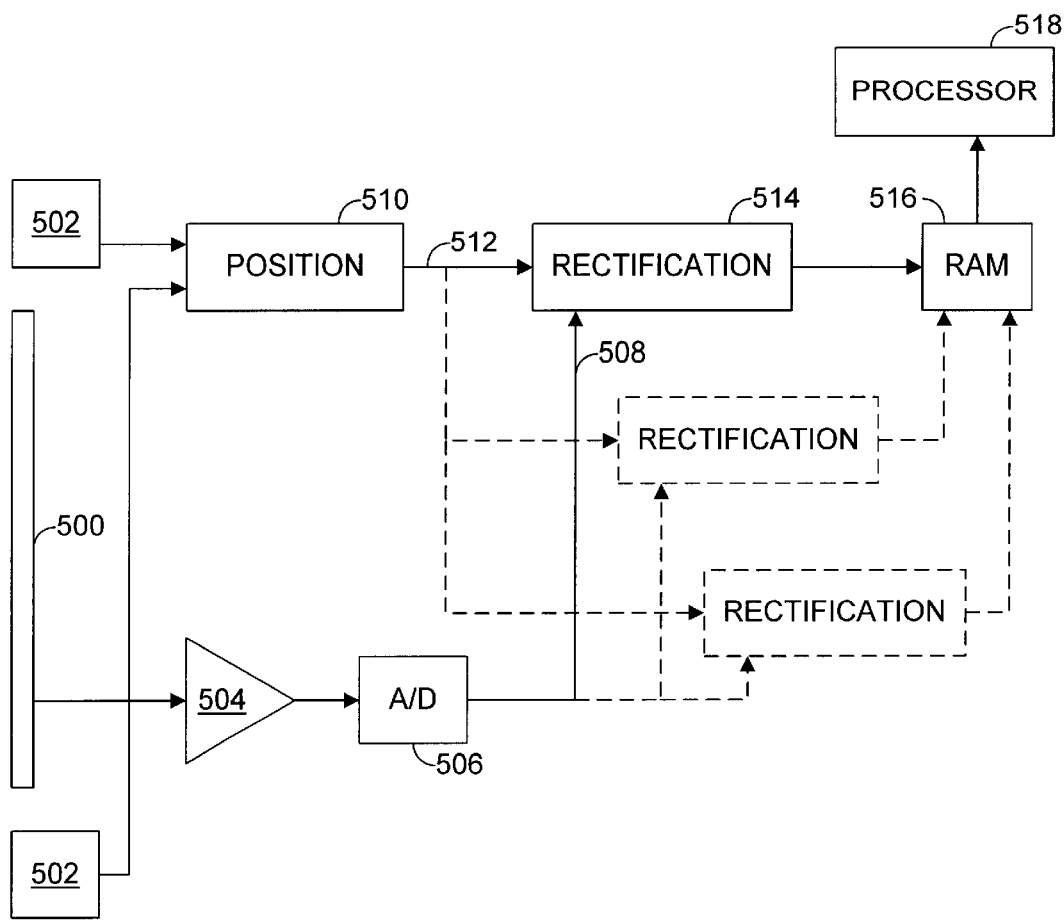
FIG. 5 is a block diagram of a hand-held scanner in accordance with the invention.

FIG. 5 illustrates a system in accordance with the invention. In FIG. 5, rectification (bilinear interpolation) is performed in real time. The sensor intensity data and array position data are not stored into memory, and the processor firmware is not in the critical path for interpolation. In FIG. 5, a linear sensor array 500 measures image intensity values at uniform positions between two end points, defining a series of scan-lines as illustrated in FIG. 3A. The analog intensity measurements are sequentially amplified (504) and digitized (506). Position sensors 502 measure relative movement of the end points of the scan line. A position processor 510 provides position data 512. A rectification module (514) receives digitized sensor intensity data 508, and position data 512, and computes pixel data. A RAM 516 receives pixel data from the rectification module. A processor 518 is not directly involved in rectification. Performance is improved because processor firmware is not required to store and retrieve image sensor data, and because fewer devices are arbitrating for access to the RAM 520.

In FIG. 5, position data is depicted as being computed by a separate module 510. However, the function of module 510 may be incorporated within the position sensor electronics 502, or within the rectification module 514. See, for example, Allen '813, which describes a method for generating relative (X,Y) displacement data. For purposes of the present invention, it is not important where position data is computed, as long as sufficient position data is available to the rectification module 510 to enable computation of rectification in real time. Processor 518 may be used to assist computation of position data, as long as position data is supplied to the rectification module in time for the rectification module to compute pixel data as soon as sufficient intensity data is received.

Figure 6:
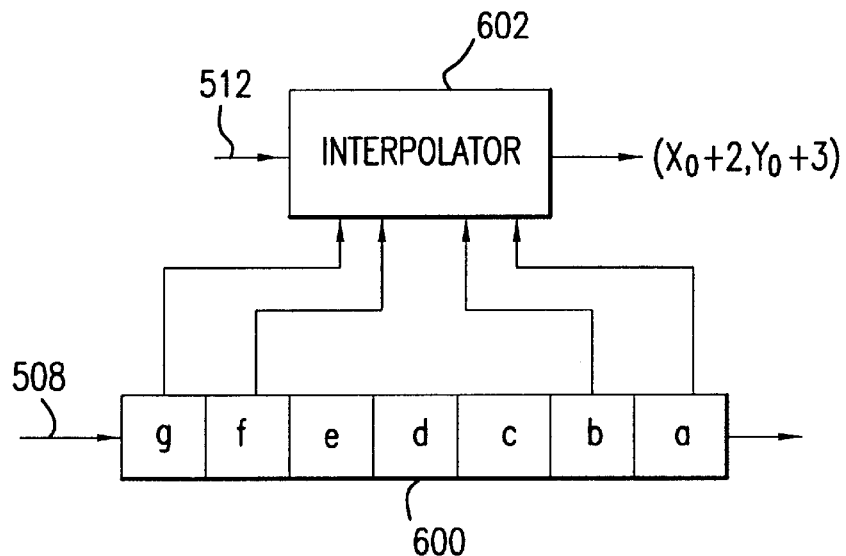
FIG. 6 is an expanded view of a first example embodiment of a rectification block illustrated in FIG. 5.

FIG. 6 provides additional detail for a first example embodiment of the rectification block (514) of FIG. 5. Interpolator 602 computes the position of each intensity value, the position of each pixel in a rectangular grid, and computes bilinear interpolation. Sequential digitized image sensor values 508 are serially entered into a buffer 600. Buffer 600 is configured as a fixed-length, first-in, first-out buffer (FIFO) with external access to the first two values and external access to the last two values. Alternatively, buffer 600 may be viewed as a data queue, or as a data shift register. Buffer 600 is long enough to hold all the values from one scan line, plus two additional values. Additional logic (not illustrated) is needed to insert blank values (or null or other distinctive additional values) into the data buffer 600, or to replace the first data value before shifting. As will be discussed below, inserting values or deleting values is determined by alignment of the beginning of consecutive scan lines. In the following discussion, the intensity value locations and pixel locations of FIG. 3A are used to illustrate example situations.

In FIG. 6, all the values from scan-line 300 (FIG. 3A) have been entered into the buffer 600, along with the first two values of scan-line 302. The interpolator 602 receives the first two values in buffer 600 and the last two values in buffer 600, along with position information 512. In FIG. 6, interpolator 602 receives values (a), (b), (f), and (g). From FIG. 3A, note that pixel $(X_0+2, Y_0+3)$ may be computed using bilinear interpolation, given values (a), (b), (f), and (g) and the corresponding position data.

Figure 7A:
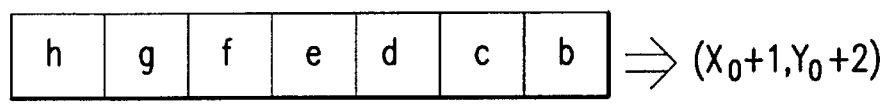
FIGS. 7A, 7B, 7C, and 7D are block diagrams of a buffer in FIG. 6 illustrating various example states for data in the buffer.

FIG. 7A illustrates the buffer 600 after intensity value (h) (FIG. 3A, scanline 302) has been entered. Note that when intensity value (h) is entered, intensity value (a) is discarded. There is no need for value (a) after pixel $(X_0+2, Y_0+3)$ has been computed and saved. Again, from FIG. 3A, note that pixel $(X_0+1, Y_0+2)$ may be computed using bilinear interpolation, given values (b), (c), (g), and (h) and the corresponding position data.

Figure 7B:
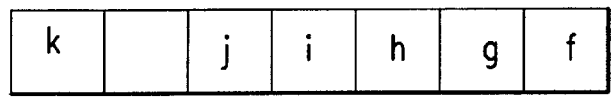
Figure 7C:
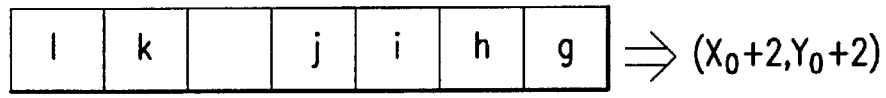

There are several special cases that must be considered as image data are entered into the buffer 600. The special cases involve alignment of the ends of the scan lines. Note in FIG. 3A that the upper end points of the scan lines are illustrated as drifting non-linearly towards the $Y_0$ reference. Intensity value (f) (the beginning of scan-line 302) has a Y coordinate that is greater than $Y_0+3$ whereas intensity value (k) (the beginning of scan-line 304) has a Y coordinate that is less than $Y_0+3$. That is, the end points of scan-lines 302 and 304 are not aligned. As a result, pixel data having the coordinate $(X_0+3, Y_0+3)$ cannot be computed, or the pixel data for that coordinate must be treated as a special case. In FIG. 7B, a blank (or null or other distinctive flag) value has been inserted ahead of value (k), effectively aligning scan-line 304 to scan-line 302. No pixel data are generated when one of the values is blank (or null or other distinctive value). In FIG. 7C, when value (l) is entered, then values (g), (h), (k), and (l) are used to compute pixel $(X_0+2, Y_0+2)$.

FIGS. 7B and 7C illustrate the special case when one scan-line (304) begins below the preceding scan-line (304). The opposite situation may occur. For example, in FIG. 3A, assume that the scanner is moving from right to left, so that scan line 304 occurs before scan-line 302. In this case, when it is discovered that intensity value (f) is above $Y_0+3$, intensity value (f) replaces intensity value (o). That is, intensity value (o) is effectively dropped, thereby properly aligning intensity values within the data buffer.

Figure 3B:
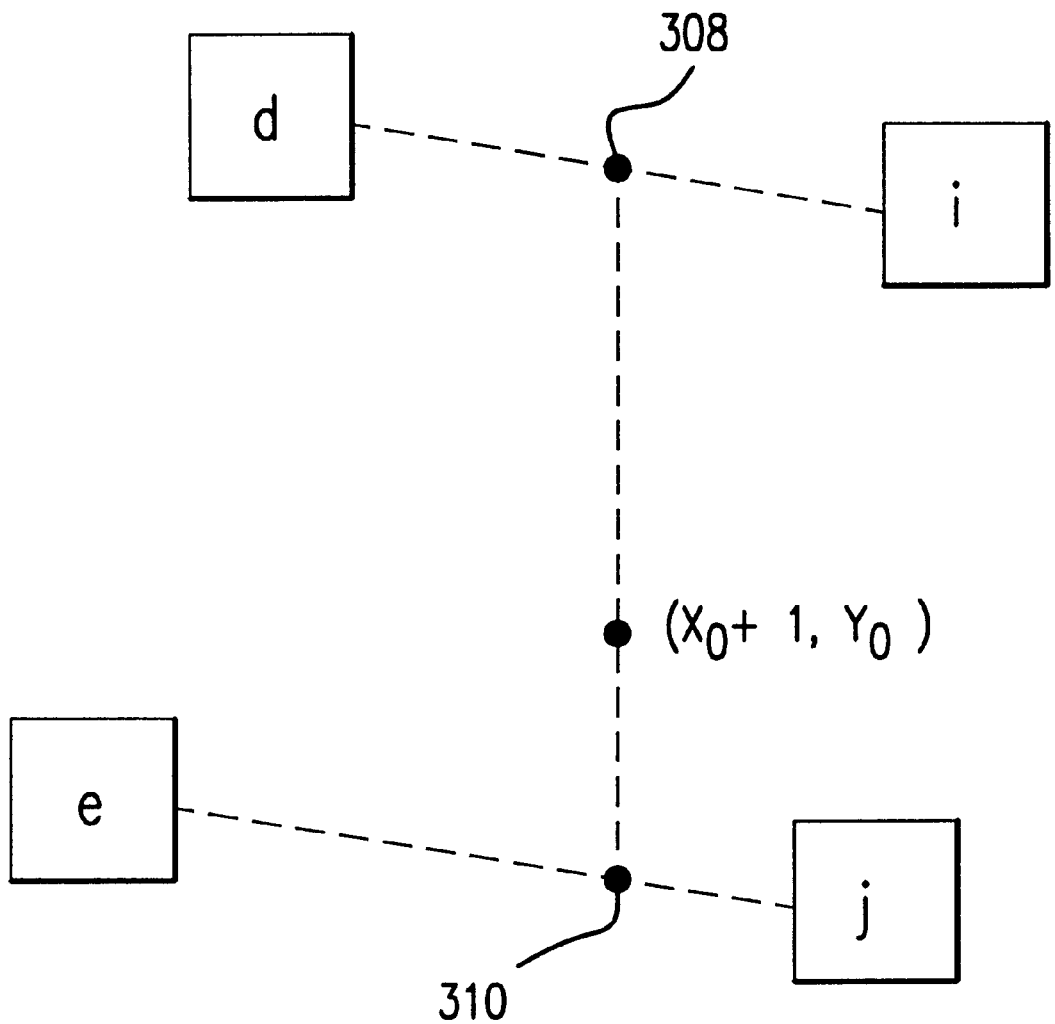
FIG. 3B (prior art) is an expanded view of one point on the pixel grid illustrating bilinear interpolation.
Figure 4:
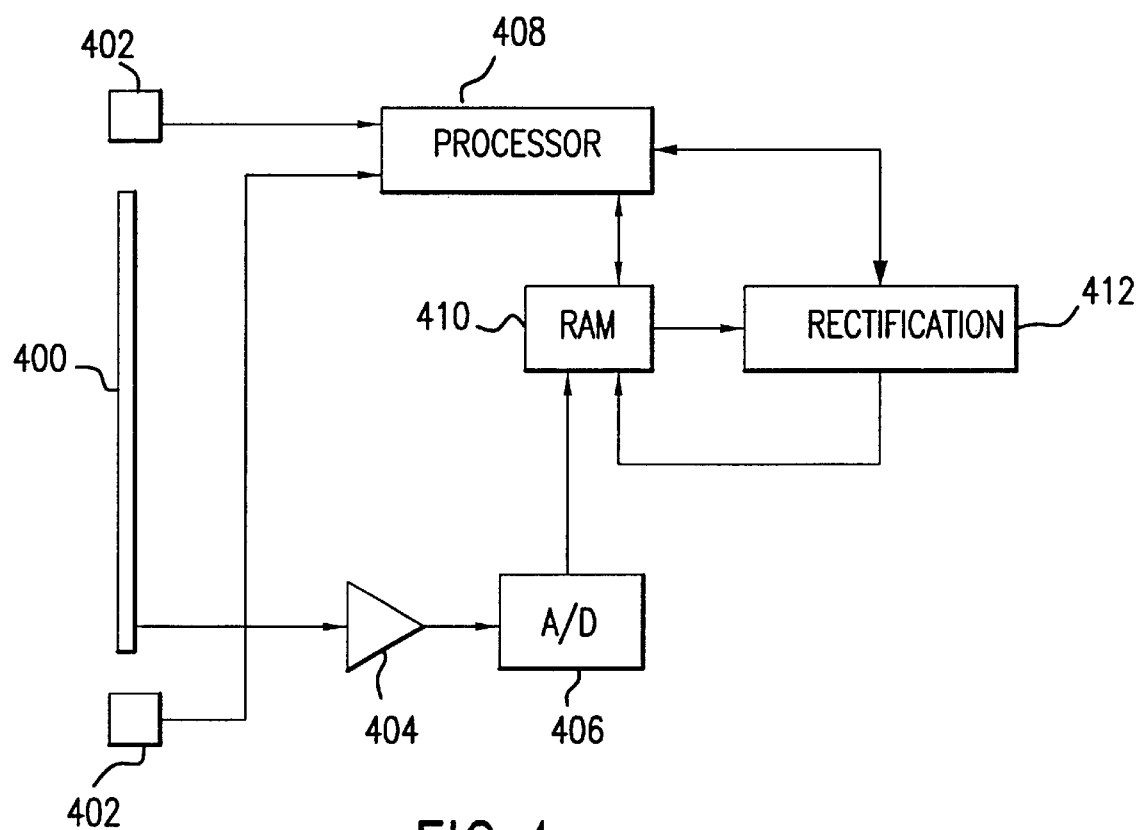
FIG. 4 (prior art) is a block diagram of a hand-held scanner system.
Figure 7D:

Some sensor intensity values are not needed because they are outside a boundary. For example, in FIG. 3, if row $Y_0$ represents a lower boundary, values (o) and (t) are not needed. However, values (o) and (t), or blank values, need to be entered into the buffer 600 to preserve alignment. For example, in FIG. 7D, a blank value has been entered for value (o), and values (m), (n), (r) and (s) are properly aligned within the data buffer for computation of pixel $(X_0+2, Y_0)$.

Figure 8:
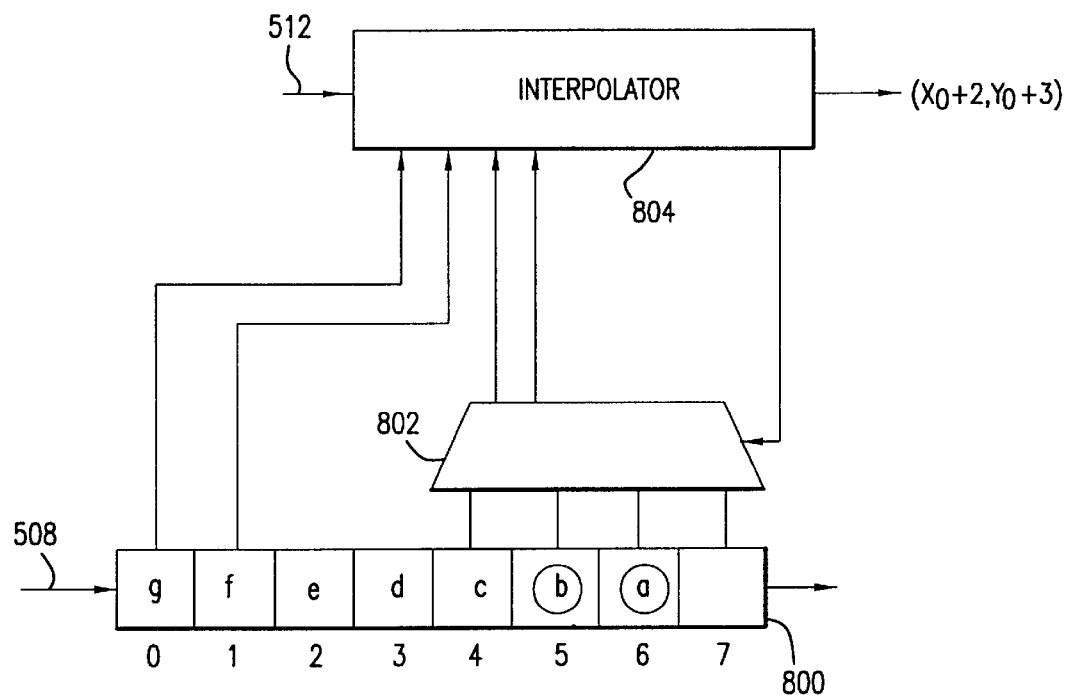
FIG. 8 is an expanded view of a second example embodiment of the rectification block illustrated in FIG. 5.
Figure 9A:
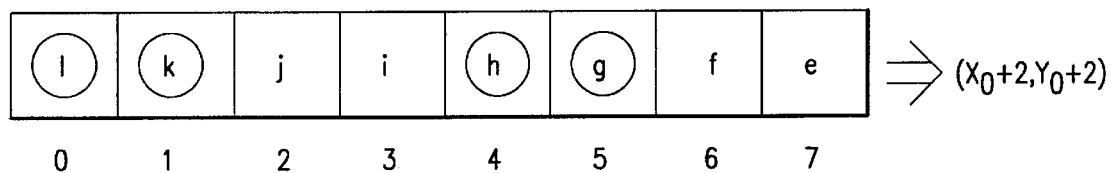
FIGS. 9A and 9B are block diagrams of a buffer in FIG. 8 illustrating various examples of states for data in the buffer.
Figure 9B:
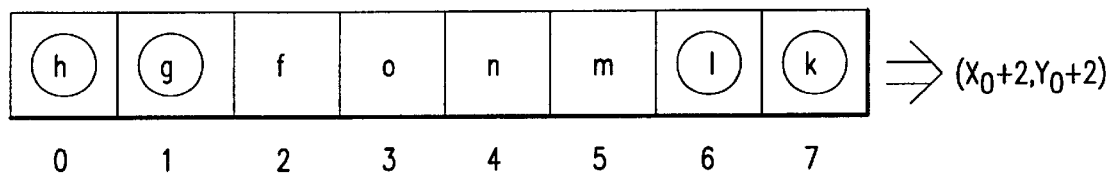

FIG. 8 illustrates an alternative example embodiment of the rectification block 514 in FIG. 5. In FIG. 8, instead of inserting extra values or dropping values to preserve a fixed data buffer alignment as in FIGS. 6, 7A–7D, a multiplexer 802 is used to shift which data values are read from the data buffer 800 by the interpolator 804. The interpolator 804 controls the multiplexer 802, based on the position of the beginning of one scan-line relative to the position of the beginning of the preceding scan-line. In FIG. 8, the buffer is illustrated as having a capacity that can hold one full scan-line plus three additional values. A larger buffer may be needed, depending on realistic permissible hand motion. That is, how far can two consecutive scan-lines be misaligned? Similarly, in FIG. 8, the multiplexer 802 as illustrated can select two of four inputs, but the range of buffer elements that must be selected by the multiplexer depends on realistic permissible hand motion. In FIG. 8, the buffer elements are numbered from 0–7. If scan-lines are aligned, the multiplexer 802 is controlled to select elements 5 and 6. For example, for pixel $(X_0+2, Y_0+3)$, the multiplexer 802 is controlled to select buffer elements 5 and 6 so that the interpolator receives intensity values (a), (b), (f) and (g). When scan-lines are not aligned, the multiplexer is controlled to select elements other than elements 5 and 6. For example, in FIG. 9A, corresponding to the situation in FIG. 7C, the multiplexer is controlled to select elements 4 and 5 (intensity values (g) and (h)). In FIG. 9B, if the direction of scanning is reversed so that scan-line 304 (FIG. 3A) occurs before scan-line 302, then when element (f) enters the data buffer 800, the multiplexer is controlled to select elements 6 and 7.

A real time rectifier, as illustrated in FIG. 5 (514), is equally applicable to a hand-held color scanner. For color scanning, the document may be sequentially illuminated by different colors while being scanned by a single linear sensor array. For example, the scan-line may be illuminated by red light, then by blue light, and then by green light, in a repeating sequence. Each illumination results in one scan-line. Scan-lines of the same color may then be rectified. One straightforward solution is to provide three data buffers and three interpolators, each data buffer receiving sensor data of a single color. Then, red data are always entered into a red data buffer, blue data are always entered into a blue data buffer, and so forth. Alternatively, three linear sensor arrays may be used, with each linear sensor array being filtered to receive a different color. Again, three buffers and three interpolators may be used, each buffer receiving sensor data of a single color. Color scanners may use more than three colors, and one "color" may be white. In general, for color scanning, one rectification block, as illustrated in FIG. 5 (514), may be used for each separate color channel. FIG. 5 depicts the optional additional rectification blocks in dashed lines.

FIG. 5 depicts a linear sensor array. For many two-dimensional sensor arrays, intensity signals are serially shifted out of the two-dimensional array one row at a time. Therefore, the present invention is also applicable to rectification of images from two-dimensional sensor arrays. For example, some surveillance cameras use a wide angle lens (such as a "fish-eye" lens), which results in a distorted image. Image processing software is then used to rectify the image. For some limited known aberrations due to an optics system, a system as illustrated in FIGS. 5, 6 and 8 may be used to rectify the image in real-time as the intensity signals are digitized.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An image scanner comprising:
    a light sensor array generating signals representing light intensity;
    an analog-to-digital converter, receiving the signals from the light sensor array and generating intensity data;
    a position sensor system, generating position data representing a position of the scanner;
    a buffer, receiving the intensity data directly from the analog-to-digital converter; and
    an interpolator, receiving the intensity data from the buffer and the position data from the position sensor system, the interpolator generating pixel data, the pixel data comprising interpolated intensity data, the pixel data corresponding to coordinates that are different than coordinates for the intensity data, the interpolator generating pixel data immediately when sufficient intensity data have been generated by the analog-to-digital converter.

2. A scanner as in claim 1, further comprising:
    the intensity data from the analog-to-digital converter logically grouped into scan-lines, each scan-line comprising a set of intensity values for one position of the scanner; and
    the buffer having a capacity sufficient to hold all the intensity values from a first scan-line plus at least two intensity values from a second scan-line.

3. A scanner as in claim 2, further comprising:
    the interpolator receiving at least two intensity values from the first scan-line and at least two intensity values from the second scan-line.

4. A scanner as in claim 3, the at least two intensity values from at least one of the first and second scan-lines being received by the interpolator from fixed locations within the buffer.

5. A scanner as in claim 3, the at least two intensity values from at least one of the first and second scan-lines being received by the interpolator from variable locations within the buffer.

6. A scanner as in claim 1, further comprising at least two additional interpolators, each interpolator generating pixel data for a different color.

7. A method of scanning an image, the method comprising the following steps:
    generating intensity values;
    generating position data for the intensity values;
    storing the intensity values temporarily in a buffer;
    receiving, by interpolation circuitry, the intensity values from the buffer, and position data, immediately after the intensity values and position data are available; and
    computing, by the interpolation circuitry, pixel data, based on the intensity values and the position data, the pixel data comprising interpolated intensity values, the pixel data corresponding to coordinates that are different than coordinates for the intensity data.

* * * * *